July 30, 1957  C. J. KOONS ET AL  2,801,127
UNIVERSAL SPREADER BAR
Filed April 19, 1956  4 Sheets-Sheet 1
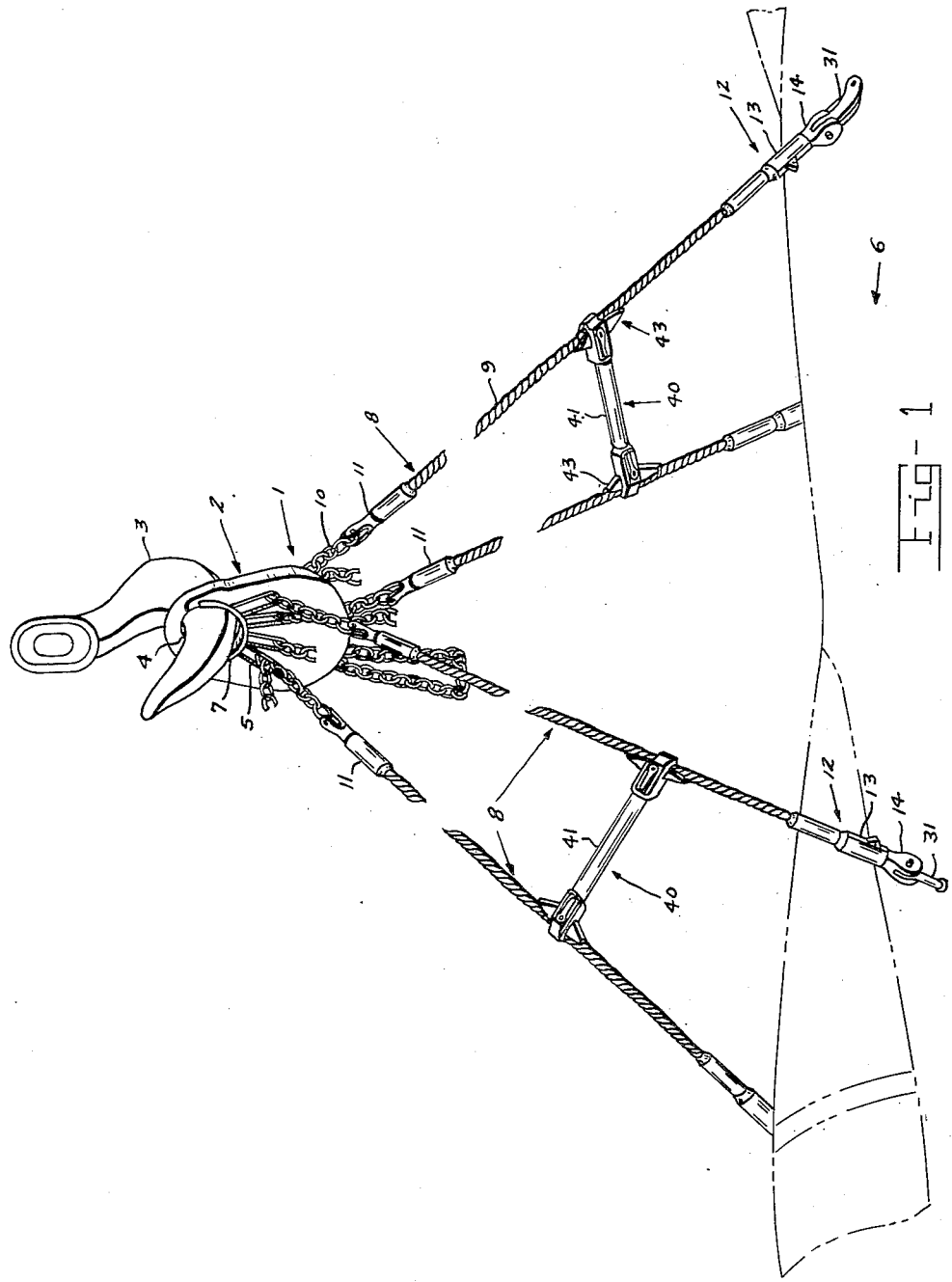
INVENTORS
GERALD D. ARCHDEACON
CLARENCE J. KOONS
BY
ATTORNEYS

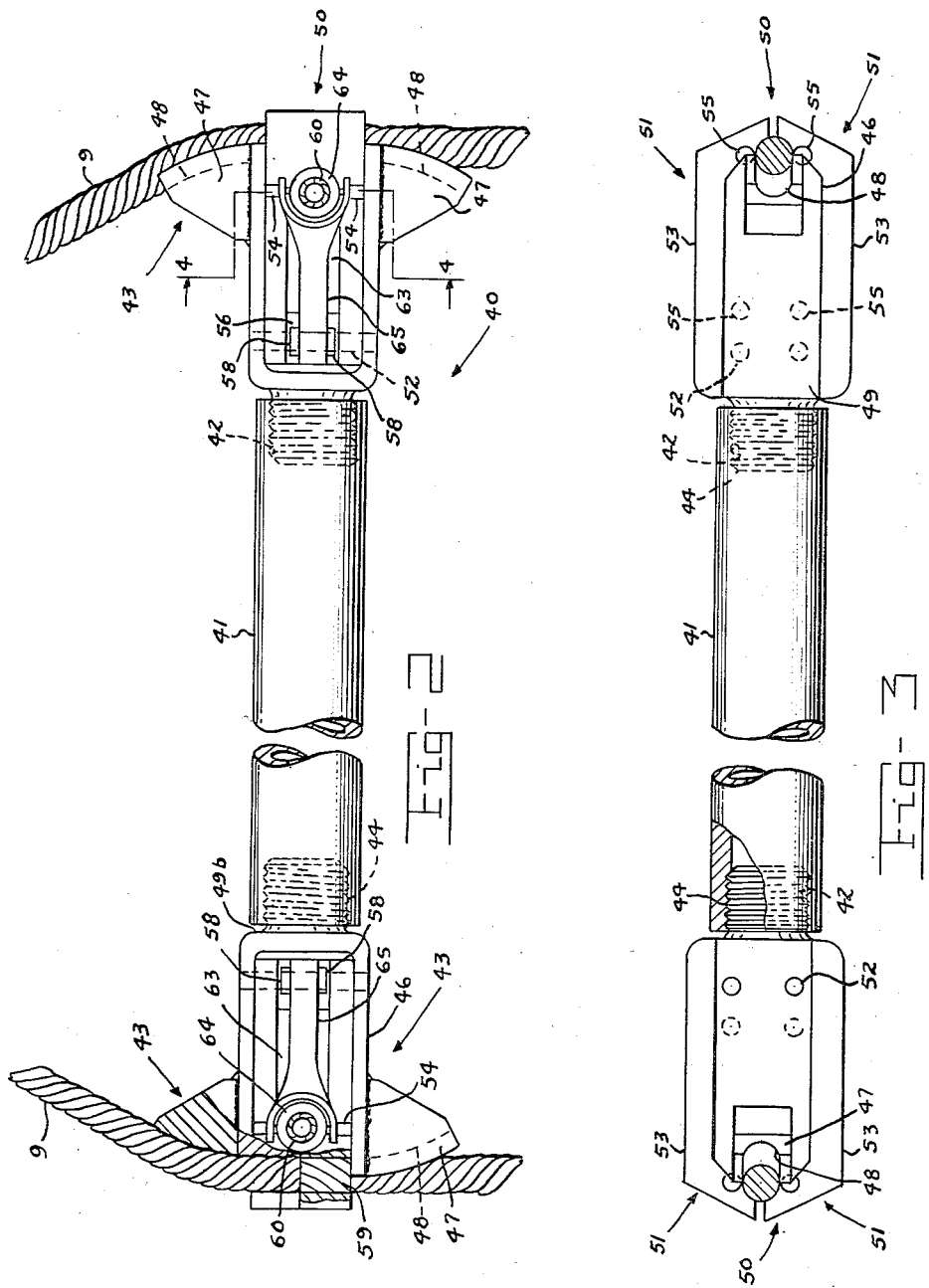

July 30, 1957 C. J. KOONS ET AL 2,801,127
UNIVERSAL SPREADER BAR
Filed April 19, 1956 4 Sheets-Sheet 3
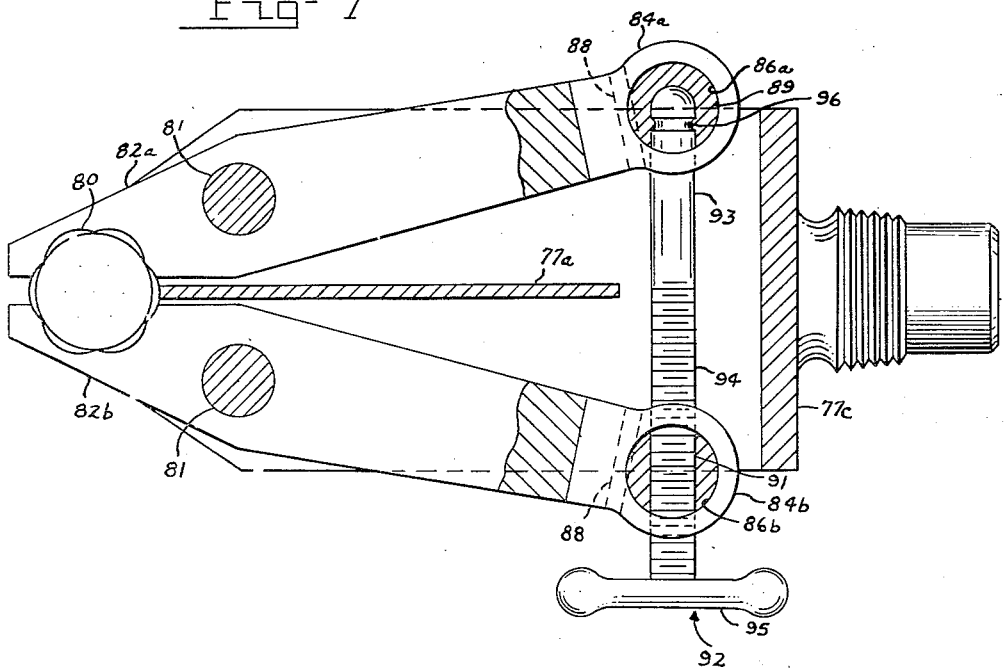
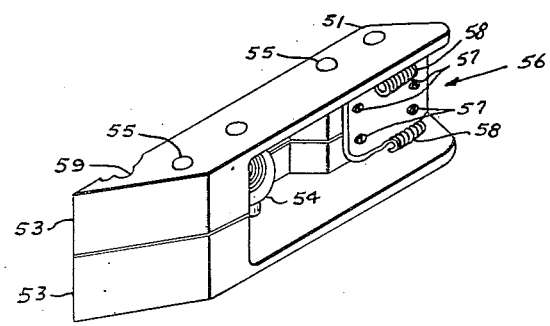
INVENTORS
GERALD D. ARCHDEACON
CLARENCE J. KOONS
BY
ATTORNEYS

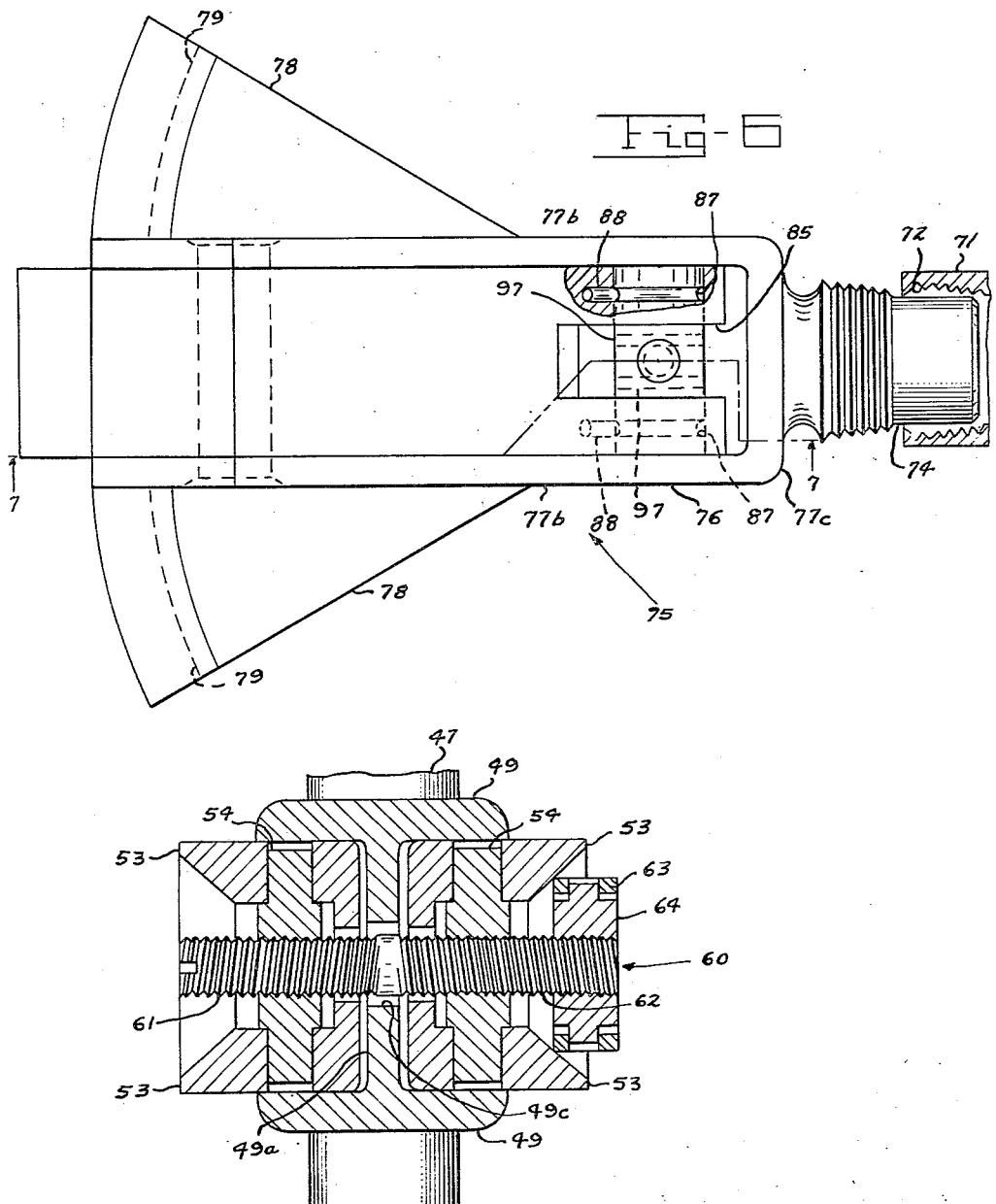

United States Patent Office 2,801,127
Patented July 30, 1957

2,801,127

UNIVERSAL SPREADER BAR

Clarence J. Koons, Columbia, Pa., and Gerald D. Archdeacon, Fairborn, Ohio, assignors to the United States of America as represented by the Secretary of the Air Force Application April 19, 1956, Serial No. 579,415

10 Claims. (Cl. 294—81)

(Granted under Title 35, U. S. Code (1952), sec. 266)

The invention described herein may be manufactured and used by or for the United States Government for governmental purposes without payment to us of any royalty thereon.

The present invention relates to an improvement in the spreader bar arrangements used on a cable sling, and more particularly, to a spreader bar which is adjustable, yet is securely attachable to the pendent cable members of a crane sling to establish the desired clearance between the cables and the load to be lifted.

It is a primary object of this invention to provide a spreader bar arrangement which is adjustable and extensible to attain the required clearance between the cable members and the particular load to be lifted.

It is a further object to provide a spreader bar arrangement which will prevent undue relative movement between the cables and the spreader bar, and which will prevent twisting and slipping of the cable members on the spreader bar, once attached.

It is another object to provide a spreader bar arrangement having securing means disposed against loosening during the lifting operation.

It is still a further object to provide a spreader bar arrangement establishing a graduated angular relationship between the spreader bar and the attached cables to prevent excessive bending and chafing of the cable.

With the above improvements and other objects in view, the present invention consists of various improved features in the spreader bar wherein clamping means are provided conformable to various sizes of cables, and may be spaced at any desired length by means of replaceable insert means connected between the clamping means to correspond with the clearance required between the cables; the clamping means further cooperate with guide means to maintain the cables in a fixed position with respect to the spreader bar during the lifting operation.

The invention consists also in the novel parts and in the combination and arrangement of parts as hereinafter particularly described and claimed.

Figure 1 is a perspective view showing a crane sling in attached position on an aircraft, and utilizing the spreader bar to provide clearance between the aircraft and crane sling;

Fig. 2 is a side plan view partially in section of the spreader bar in attached position;

Fig. 3 is a top plan view partially in section of Fig. 2;

Fig. 4 is a detailed sectional view taken on the lines 4—4 of Fig. 2;

Fig. 5 is a perspective view of a jaw portion of the spreader bar;

Fig. 6 is a fragmentary elevational view, partly in section, of a modified form of spreader bar;

Fig. 7 is a bottom elevational view partly in section taken about the lines 7—7 of Fig. 6.

Referring more particularly to the drawings, there is shown in Fig. 1 a crane sling 1 having a main lift ring 2 suspended from a standard crane hook 3, which is attached to a crane or hoist mechanism (not shown). Extending outwardly and downwardly from the inner periphery of the ring 4 are longitudinal slots 5. Mounted on the inner periphery of the ring 2 is an annular, channel-shaped retainer plate 7 shown in a downwardly disposed position so as to close the inner ends of the slots 5.

Fig. 1 further shows the pendent cable chain members 8 which are provided with a chain length 10 attached by means of a coupling 11 to the upper end of the cable 9, each chain length inserted within a slot 5. Coupling means 12 are also provided at the opposite end of each cable chain member 8 to interconnect each cable chain and a load member 6 to be lifted, the coupling means 12 broadly including a socket assembly 13 attached to the cable chain and shackle member 14 attached to suitable fastening means 31 provided on the load.

A spreader bar 40, shown in attached position in Fig. 1 and in more detailed form in Figs. 2 and 3, includes a central tubing member 41 provided with internal threaded portions 42 at each end.

Guide assembly portions 43 are connected to the central tubing member by means of a threaded plug or stud member 44. Each guide assembly 43 further includes a bracket support 46 in the form of an I-shaped beam in cross-section, as shown in Fig. 4, having upper and lower cross-plate portions 49, a central web member 49a perpendicular to the plates 49 and interconnecting them, and an end plate 49b. The flanged portions or guides 47 are welded above and below the bracket support and are provided with an arcuate grooved guide passage 48 for positioning of the cable.

A jaw assembly 50 is attached to each guide assembly 43, and is made up of two jaw members 51 for pivotal mounting within the upper and lower plates 49 and on each side of the web 49a by means of a pin member 52. Each jaw member 51 is made up of two coincident segments 53, as shown in Fig. 5, and pivot nut 54 interposed between the coincident segments 53. Pins 55 also are driven into the coincident segments to connect them, and a clip member 56 is fastened to the side of the combined segments 53 by screws 57, the clip 56 including upper and lower spring members 58.

The outer end of the jaw members 51 is provided with spiral, grooved passages 59, each groove in the passage being preformed to the exterior configuration of the cable to grip a cable strand when the jaw portions are in clamping positions on the cables.

The jaw members 51 are assembled into clamping position by first passing a locking screw 60, having a left hand threaded portion 61 and right hand threaded portion 62, through a bore 49c provided on the bracket support, as shown in Fig. 4. The jaw members are then positioned on the screw 60 by threading the pivot nuts 54 onto the threaded portions 61 and 62. The pin members 52 are then driven through the bracket support and jaw member to pivotally mount the jaw members within the bracket support.

A wrench member 63, made up of a bolt head 64 for attachment with the threaded portion 62, and a handle 65 pivotally mounted in the bolt head 64, is provided for loosening and tightening adjustment of the jaw members. The bolt head is preferably permanently and rigidly attached to the threaded portion 62 by tinning the threaded portion and the bolt head with solder, screwing them together while hot then allowing to cool. By turning the wrench in a clockwise direction the jaw members will then become separated, and loosened in turning the wrench counter-clockwise. The bolt head 64 is further connected to the threaded portion in such a way that the opposite sides of the wrench handle 65 may be clamped within the springs 58 when the jaw members are in clamping position on the cable, thereby holding the handle out of the way and preventing loosening during the lift operation.

In operation, the sling 1 is first secured by means of the coupling 12 to the load to be lifted. The cable chain members 8 are then adjusted within the slots 5 to maintain the center of gravity of the load directly beneath the lifting ring 2. The length of the central tubing member 41 to be used will be determined by the clearance required between the cable chains 8 and the load so as to prevent contact between the cable chains and the load during the lifting operation. Of course, in determining the length of the central tubing member 40, allowance is made for the length of the guide assembly portions which are attached to each end of the member 40. The loose jaw portions 50 are then placed over the cable, once each cable has been positioned on the guide passages 48. The locking screw 60 is then turned by the wrench 63 to tighten the jaw clamping surfaces or passages 59 on the cable. The handle 65 is then secured to the clip to maintain the locking screw 60 in tight clamping position during the lifting operation.

To adjust the center bar 40 on the cable to a different position, the wrench handle 65 may be unclipped and the locking screw loosened. Once the load is attached, making certain that the cable strands are securely set within the preformed cable strand grooved passages 59, the load may then be lifted without danger of the cables 9 slipping, notwithstanding the inward and downward force applied by the upper end of the cables on the center bar 40. The flanged portions 47, particularly the upper flanged portions, will prevent excessive binding of the cables against the upper corners of the bracket supports 46 and the spiral grooved passages 59 and the grooved passages 48 will cooperate to prevent lateral bending of the cables with respect to the spreader bar, and twisting of the cables within the jaws.

The spreader bar described may thus be utilized, regardless of the clearance required by the load, merely by inserting the desired length central tubing member, and the guide assembly may be adjusted at any point of contact desired on the cable. In this way the spreader bar is adaptable and adjustable for all types of cable sling operation.

Figs. 6 and 7 illustrate a modified form of guide assembly and jaw assembly wherein a guide assembly 75 is provided with a threaded plug member 74 for connection to a central tubing member or pipe 71, the central tubing member having internally threaded portions 72 at each end. The guide assembly 75 further includes a bracket support 76, the bracket support having an I-shaped cross-section made up of a vertical web portion 77a, upper and lower cross plates 77b and an end plate 77c inclosing the inner end of the bracket. Welded on the upper and lower plate portions 77b are the guide extensions 78 having arcuate grooved passages 79 extending in circumferential fashion into a preformed cable strand grooved portion 80 of the bracket support itself. Interposed within the upper and lower plates 77b and pivotally mounted therein by means of a pin 81 are jaw portions 82a and 82b. Each of the jaw portions 82a and 82b are provided with the similar spiral, grooved passages 80 for insertion of the cable at the outer end thereof. The jaw portions 82a and 82b are further provided at inner ends 84a and 84b, respectively, with a transverse slotted portion 85. A cylindrical insert 86a is journaled in the end 84a having annular channels 87 disposed above and below the slotted portion 85; locking pins 88 are then driven across the path of the channels 87 to vertically position the insert 86a within the inner end 84a, and to permit rotatable movement of the insert. A transverse socket 89 is also provided on the insert 86a for placement opposite the slotted portion 85 when the insert is in position.

The inner end 84b is provided with a similar cylindrical insert 86b and having similar annular channels 87 and locking pins 88 for vertical positioning of the insert within the inner end as provided for in the inner end 84a. The insert 86b is further provided with a transverse threaded bore portion 91 extending completely through the insert 80 so as to be disposed opposite the slotted portion 85 when vertically positioned.

A clamp screw 92 is passed through the threaded bore 91 and into the transverse socket 89 having a smooth cylindrical shoulder portion 93, a raised threaded portion 94, and handle 95. An annular channel 96 is disposed at the distal end of the shoulder 93 for locking engagement within the socket by means of a locking pin 97 driven into the socket so as to be positioned across the channel 96.

The adjustment and operation of the modified form of spreader bar is essentially the same as that of our preferred embodiment, except the means provided for tightening the jaws. To clamp the jaw passages 80 together, the clamp screw 92 is threaded inwardly through the bore 91 to force the end 84a outwardly with respect to end 84b thereby forcing the passages together. To loosen for adjustment or resetting, the clamp-screw operation is reversed to force the inner ends toward each other.

For purposes of exemplification particular embodiments of the invention have been shown and described according to the best present understanding thereof. However, it will be apparent that many changes and modifications in the arrangement and construction of the parts thereof may be resorted to without departing from the true spirit and scope of the invention.

We claim:

1. A cable sling comprising a main lifting ring, a plurality of pendent cables attached to said ring, fastening members to attach said cables to the load to be lifted and spacing means to space two adjacent cables to establish the desired clearance between said load and said cables, said spacing means having a support member at each end thereof, jaw portions pivotally attached to said support member and cooperating therewith to clamp said cables, and means inserted between said support member replaceable to correspond in length with the spacing required between said cables.

2. The sling according to claim 1, in which said spacing means further comprise cable guide flanges connected to said support member having arcuate passages to guide said cables at a predetermined angle with respect to said spacing means.

3. The sling according to claim 1, in which said jaw portions and support member are provided with cable engaging, spiral groove passages cooperating to prevent twisting and slipping of said cables therein upon application of said load.

4. In a sling of the character described, a spreader bar comprising guide means connected at each end thereof, jaw portions pivotally attached to each of said guide means, and tightening means interconnecting said jaw portions adjacent the movable ends of said jaw portions to adjust the movable ends to grip two adjacent cables of said sling, means inserted between said guide means to correspond in length with the spacing required between said cables, and arcuate means having a grooved passage to maintain said cable at a predetermined angle with respect to said spreader bar.

5. The spreader bar according to claim 4, in which the movable ends of said jaw portions are provided with grooved passages, said jaw portions cooperating with said arcuate means to retain said cables in a fixed position with respect to said spreader bar.

6. A universal spreader bar apparatus to space two adjacent cables of a sling arrangement, said spreader bar comprising: replaceable insert means to adjust the length of said spreader bar; guide means connected at each end of said insert means, each having a grooved passage to position and guide said cables at a predetermined angle with respect to said spreader bar; clamping means including jaw portions pivotally attached to each of said guide means and provided with threaded bore portions, said clamping means operative to grip said cables; means interconnecting the bore portions of said clamping means to tighten said clamping means on said cables; and means to restrain said tightening means against movement within said clamping means.

7. A universal sling for the lifting and displacement of a plurality of load members wherein each load varies in weight and each load necessitates a varied sling configuration to lift said load in a balanced position, said sling comprising a main lift ring, a plurality of pendent members extending downwardly from said lift ring, fastening means adaptable to interconnect said pendent members and said load members and spacing means adapted to establish clearance between said sling and said load, said means comprising: a central tubing member internally threaded at each end; guide assembly portions, one disposed at each end of said tubing, each having a threaded plug member for connection therewith, an arcuate cable guide provided with a grooved passage, a bracket support member interconnecting said cable guide and said plug and laterally extending behind said cable guide, jaw assembly portions, one attached to each guide assembly, each jaw assembly including two jaw members pivotally mounted within each side of said bracket support, each jaw member made up of two vertically disposed, coincident segments, a wing nut disposed between said coincident segments to maintain vertical alignment thereof, a clip member to interconnect said segments and having upper and lower springs, and spiral grooved passages at the outer end of said jaw portions to grip the strands of said cable; a threaded stud member extending through said jaw assembly and said bracket support to maintain said jaw portions in clamping position with respect to said cable having a left-hand thread at its one end to correspond with the threaded portion of said one wing nut, right-hand threads corresponding to the threaded portion of said other wing nut; a wrench member including a bolt-head and a threaded opening to correspond with the threaded portion of said stud projecting on one side of said jaw assembly, and a handle portion pivotally connected to said bolt-head and fastened within said clip springs to maintain said bolt-head in a fixed position on said stud.

8. A spreader bar apparatus, adjustable and extensible, to space two adjacent cables of a heavy duty sling arrangement to correspond with the clearance required in the lifting of a plurality of different loads, said bar comprising: a central tubing member; guide assembly portions, one disposed at each end of said tubing, each having a threaded plug member for connection therewith, an arcuate cable guide provided with a grooved passage, a bracket support member interconnecting said cable guide and said plug and laterally extending behind said cable guide; jaw assembly portions, one attached to each guide assembly, each jaw assembly including two jaw members pivotally mounted within each side of said bracket support, each jaw member made up of two vertically disposed, coincident segments, a wing nut disposed between said coincident segments to maintain vertical alignment thereof, a clip member to interconnect said segments and having upper and lower springs, and spiral grooved passages at the outer end of said jaw portions to grip the strands of said cable; a threaded stud member extending through said jaw assembly and said bracket support to maintain said jaw portions in clamping position with respect to said cable having a left-hand thread at its one end to correspond with the threaded portion of said one wing nut, right-hand threads corresponding to the threaded portion of said other wing nut; a wrench member including a bolt-head and a threaded opening to correspond with the threaded portion of said stud projecting on one side of said jaw assembly, and a handle portion pivotally connected to said bolt-head and fastened within said clip springs to maintain said bolt-head in a fixed position on said stud.

9. A universal spreader bar apparatus to space two adjacent cables of a sling arrangement, said bar comprising: a central tubing member; guide assembly portions, one disposed at each end of said tubing, each including a bracket support connected to said plug and an arcuate cable guide section provided with a grooved passage positioned on said bracket support; jaw assembly portions, one mounted within each guide assembly, each jaw assembly including two jaw members pivotally mounted within the outer end of said bracket support, each jaw member having a spirally grooved passage at the outer end thereof to grip said cable and a slotted portion at the inner end thereof, the one jaw member provided with a first pin journaled at the inner end thereof, said first pin provided with a threaded bore extending transversely therethrough opposite said slotted portion, the other jaw member provided with a second pin journaled at the inner end thereof, said second pin provided with a transverse socket opposite said slotted portion; a clamp screw interconnecting said pins, said screw having a smooth shaft portion at the distal end thereof and an annular channel thereon journaled within said transverse socket, a threaded portion engageable with said threaded bore, and a handle fixed to said threaded portion to adjust said jaw members in clamping disposition on said cable.

10. A spreader bar apparatus to space lifting cables or the like comprising: insert means to adjust the length of said spreader bar; guide means connected at each end thereof, each having a cable guide portion including a grooved surface to guide said cable, jaw members disposed on either side of each of said guide means having grooved surfaces at the outer ends thereof for gripping said cables, said jaw members pivotally attached adjacent the outer ends thereof to said guide means; and tightening means interconnecting the inner ends of said jaw members in clamping disposition on said cables.

References Cited in the file of this patent

UNITED STATES PATENTS

| | | |
|---|---|---|
| 624,077 | Patriarche | May 2, 1899 |
| 2,301,842 | Abdella | Nov. 10, 1942 |
| 2,343,045 | Butler | Feb. 29, 1944 |
| 2,492,172 | Morris | Dec. 27, 1949 |
| 2,622,540 | Stewart et al. | Dec. 23, 1952 |